Figure 1:
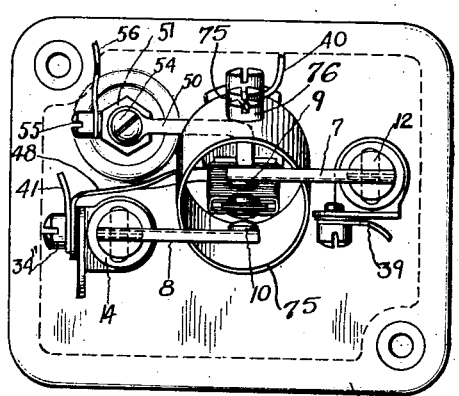

July 8, 1924.

J. B. REPLOGLE

THERMOSTAT DEVICE

Filed July 5, 1919

1,500,268

2 Sheets-Sheet 1

INVENTOR
JAMES B. REPLOGLE
By Lloyd Blackmore ATTY.

July 8, 1924.
J. B. REPLOGLE
THERMOSTAT DEVICE
Filed July 5, 1919   2 Sheets-Sheet 2
1,500,268
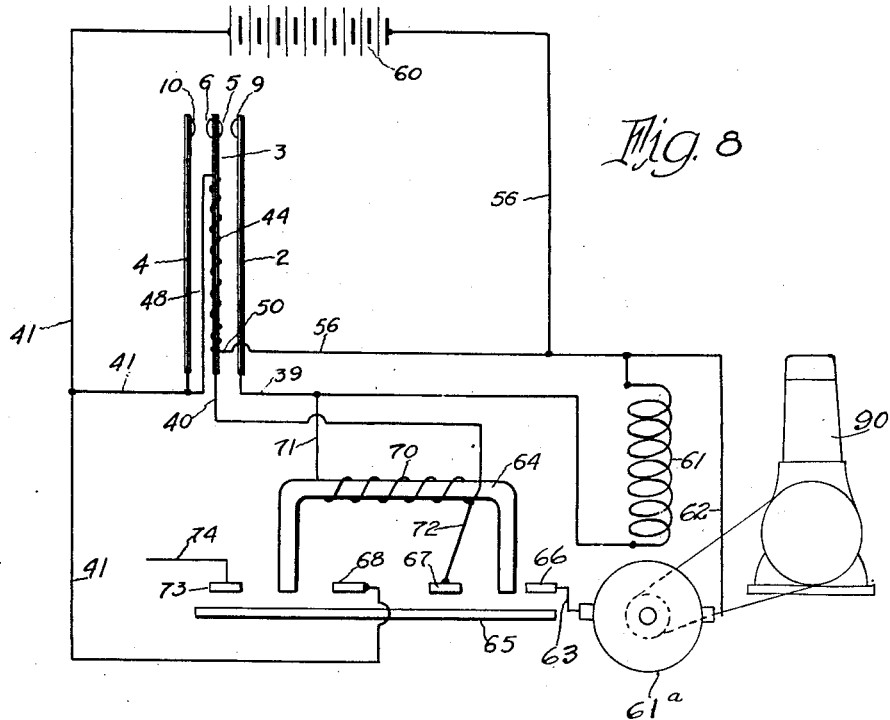
Fig. 8
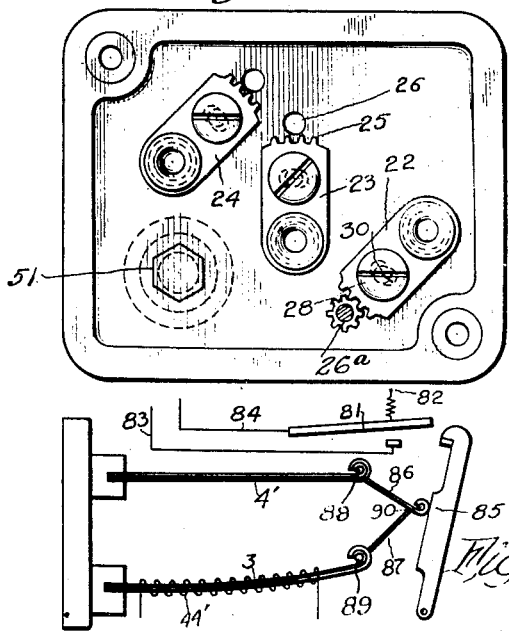
Fig. 6
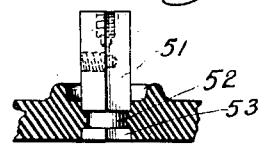
Fig. 7
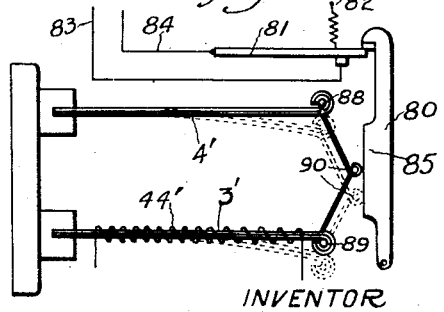
Fig. 9
Fig. 10
INVENTOR
JAMES B. REPLOGLE
By Lloyd Blackmore
ATTY.

Patented July 8, 1924.

1,500,268

UNITED STATES PATENT OFFICE.

JAMES B. REPLOGLE, OF DETROIT, MICHIGAN, ASSIGNOR TO DELCO-LIGHT COMPANY, OF DAYTON, OHIO, A CORPORATION OF DELAWARE.

THERMOSTAT DEVICE.

Application filed July 5, 1919. Serial No. 308,744.

*To all whom it may concern:*

Be it known that I, JAMES B. REPLOGLE, a citizen of the United States, and residing at Detroit, in the county of Wayne and State of Michigan, have invented a new and Improved Thermostat Device, of which the following is a specification.

The present invention relates to thermostatic devices, its object being to provide a construction which is unaffected by the environment temperature, as, for example, that of the surrounding atmosphere.

When a strip of thermostatic metal, that is, a bi-metallic strip, anchored at one end, is placed under the influence of heat, say electrically produced heat, and is put in an environment which is subject to, but relatively unaffected by, a change of temperature, the relation of the free end of the blade to its environment is a direct function of the absolute temperature of the blade. This temperature of the blade is the algebraic sum of two temperatures, namely, the environment temperature plus the electrically produced temperature. Under these conditions the position of the free end of the blade with respect to its environment will not be dependent alone upon the intensity of the electrical forces producing the temperature.

If we mount a similar thermostatic blade on one side of the blade which is subjected to electrically produced heat, with the dissimilar metals arranged in the same manner as in the two blades, we thereby create an artificial environment for the electrically heated blade which is not independent of the environment temperature but which is affected by the environment temperature changes to the same extent that the electrically heated blade is. The only force, therefore, which can affect the relation between the electrically heated blade and its new artificial environment, is the amount of temperature produced by the electric heating methods. Therefore, the relation between the electrically heated blade and the other blade is a definite measure of the electric forces which control its temperature above the temperature of the environment.

In accordance with the above principles, and with the object of attaining the purpose referred to at the outset, I provide a plurality of preferably substantially identical similarly arranged bars of thermostat material, fix or mount them relatively to one another at one end so that their free ends may be deflected substantially equally and in the same direction by the variations in environment temperature, and apply heat to one of the bars by means of an electric current. This heat, being local to the particular bar, exerts practically no influence on the associated bar, the result being that the heated bar definitely approaches or recedes from the other upon a change of current.

The heat may be applied to the thermostat bar by passing the current directly through the material of the bar or indirectly by means of a high resistance winding, or otherwise, the particular manner being dependent largely on the nature of the heating current and the desired speed of operation of the device; and the relative movement of the two bars may be made use of in various ways and for widely different purposes.

For example, I have shown it in one instance acting directly to make or break an electric circuit when the flow of current through the resistance winding becomes a predetermined minimum or maximum, as the case may be, while in another the relative movement is exercised through a toggle or lever device to release a latched element which breaks an electric circuit.

Apparatus constructed in accordance with the principles outlined above has the important advantages of few moving parts, low consumption of current, positivity of action, coupled with both delicacy and reliability of operation.

Figures 4, 5:
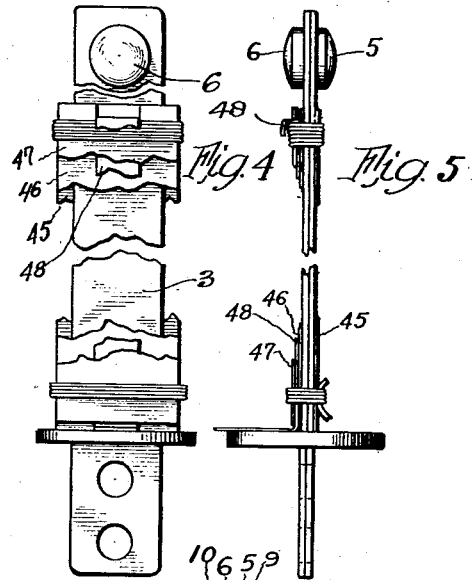
Figure 2:
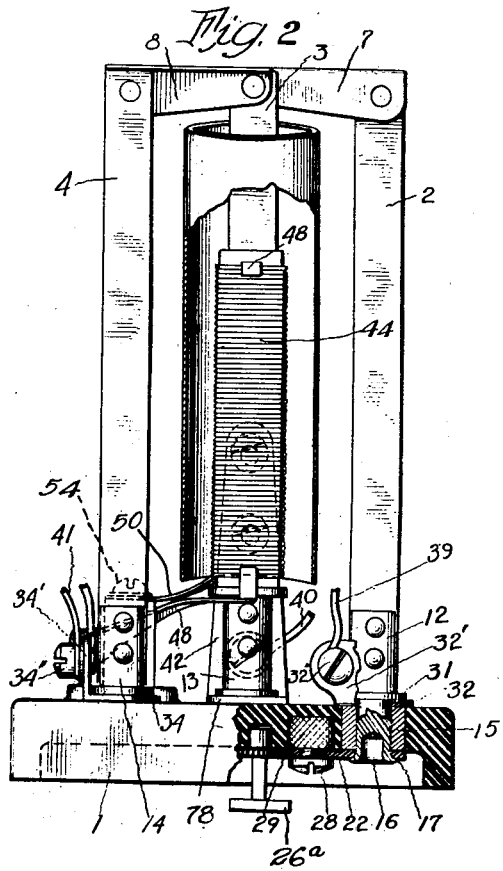
Figure 3:
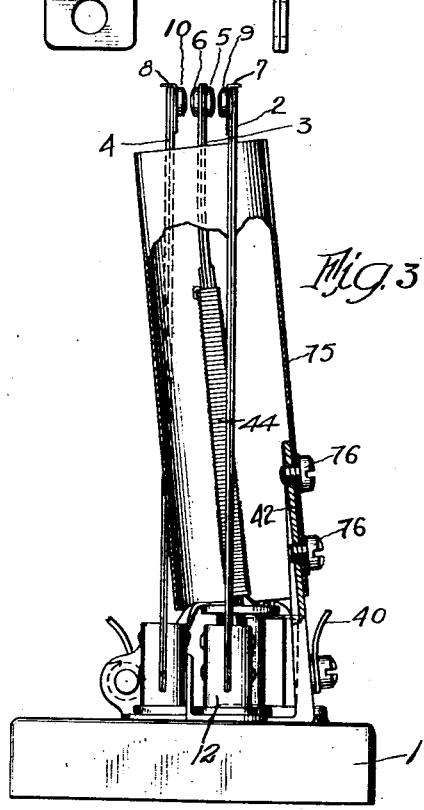

In the drawings, Fig. 1 is a plan view showing a preferred embodiment of the invention so constructed as to make either one or the other of two circuits, depending on the voltage of a battery or other current source to which it is connected. Figs. 2 and 3 are side and end views, corresponding to Fig. 1, parts being broken away. Figs. 4 and 5 are front and side views, parts being broken away, of the wound blade. Fig. 6 is an inverted plan view of the base, and Fig. 7 is a vertical section showing a preferred mounting of one of the binding posts in the base. Fig. 8 is a diagrammatic view indicating one way of applying the device illustrated in Figs. 1 to 7. Fig. 9 is a diagrammatic view showing one embodiment of the device arranged to operate as a latch releasing device for a quick break switch, the parts being shown in different positions corresponding to different environment temperatures. Fig. 10 is a similar view, one blade of the thermostat being heated to release the switch.

The device shown in Figs. 1 to 8 comprises an insulating base 1 having mounted thereon three blades 2—3—4 of suitable thermostat material such as strips of brass and steel rigidly secured together, the materials of high and low co-efficients of expansion being similarly arranged in each case. At its upper end the blade 3 carries oppositely disposed rounded contacts 5—6 of considerable size; and the blades 2—4, through the medium of arms 7—8, carry similar contacts 9—10, respectively adapted to complete circuits with the contacts 5 or 6. Thus the thermostat bars are offset considerably from each other to give space for their supporting posts.

While the construction of these posts may vary widely, it is desirable to so arrange them that the contacts may be adjusted with reference to each other. In the particular construction shown, the blades 2—3—4 are riveted over in slots formed in the corresponding, preferably identical, posts 12—13—14 that bear in and pass through inserted bushings or bearings 15, Fig. 2, in the base. The lower ends of the posts are fixed, as by drilling out their lower ends at 16 and riveting at 17 to the corresponding adjusting plate or arm 22, 23 or 24 each of which is toothed at 25, Fig. 6, to receive the teeth of a small gear-like adjusting tool 26ª, it being understood that the latter has a guiding end which is to be centered in a corresponding socket 26 when adjustment is to be made. Thus the contacts 9—10 may be swung toward or from the corresponding contact 5—6, and the blade 3 may be swung angularly to present the contacts 5—6 properly to the contacts 9—10. The several parts may be readily secured in adjusted position, for example, by the screws 28 which are threaded in knurled blocks 29 embedded in the base and which pass through slots 30 in the arms 22—23—24.

It will be observed that the posts 12 and 14 have flanges 31 between which and the base 1 certain binding clips are secured, that in the present instance comprise the base elements 32—34 and the upstanding arms 32'—34' threaded to receive binding screws 32"—34" whereby the conductors or wires 39—41 are attached. The corresponding element for attaching the wire 40 to the post 13, however, preferably extends upwardly considerably higher, as shown at 42, Fig. 3, for a purpose which will be explained later. The wires may, of course, be made fast in other ways.

Evidently, were the contact 5 for any reason to engage the contact 9, a circuit would be completed between the conductors 39 and 40; and, in like manner, the engagement of contact 6 with contact 10 completes the circuit 40—41.

In order to complete either one or the other of the circuits mentioned, depending on the particular conditions dealt with at a given time, the blade 3 is arranged to be heated by an electric current, as, for example, by means of the resistance coil 44 properly insulated therefrom as by means of the strips of mica 45—46—47, Fig. 5, it being observed that, in the embodiment shown, the strips 46—47 enclose the band or conductor 48 which leads directly to the upper end of the coil where it is soldered, thereby forming a compact construction without loose ends. The conductor 43 may have its opposite end passing under the head of the screw 34" so that it takes current from the conductor 41. Soldered or otherwise properly secured to the lower end of the coil is a second conductor band 50 which leads to a separate binding post 51 fixed in the base in any suitable manner as by grooving and squaring its lower end at 52—53, Fig. 7, and embedding it in the material of the base. A binding screw 54 serves for attaching the band and a screw 55 performs a like function with respect to the second wire or conductor 56 for the heating circuit.

The parts being properly adjusted, it is evident that the blade 3 will engage the blade 2 or the blade 4 or be in neutral position depending on whether the voltage impressed for a certain period on the coil 44 is no greater than one predetermined amount, no less than another predetermined amount or somewhere between the two.

One manner of utilizing the device is indicated in Fig. 8, wherein the conductors 41—56 lead directly to a battery or other source of electricity 60 and wherein the conductor 39 leads to the same source through a generator-motor field 61, the corresponding armature of which is on a circuit whose leads are afforded by the conductors 62—63. A relay magnet appears at 64, and this magnet is adapted to actuate a conductor bar 65 so that the contacts 66—67 and 68 are electrically connected or disconnected to each other depending on whether the magnet is energized or de-energized. The winding 70 of the relay is joined to the blade 3 by the conductor 40 and to the conductor 39 by the conductor 71; and the conductor 40 leads directly to the contact 67 through the conductor 72 so that current may by-pass the winding 70 as hereinafter explained.

Current from the source 60 flows constantly through the winding 44, heating the latter more or less depending on the voltage impressed, and without regard to the environment temperature since the influence of the environment temperature acts equally and in the same manner on all three blades. Therefore when the voltage drops to a certain predetermined amount, depending on the adjustment of the blade 4, circuit is completed through the conductor 41, the blade 4, the contacts 10—6, conductor 40, winding 70, conductor 71—39, generator field 61 and conductor 56 to the source 60, whereupon the magnet 64 actuates the bar 65 to close the circuit 41—68—65—66—63, through the generator armature 61ª and the conductor 62—56 to the negative pole of the source. The generator then acts as a motor to start an internal-combustion engine 90 by which it is thereupon driven to supply current to the source.

Upon self-actuation of the engine and the operation of the dynamo-electric machine as a generator, current flows from the positive pole of the armature 61ª through wire 63, contact 66, bar 65, contact 68 and wire 41 to the positive pole of battery 60, thence through wires 56 and 62 to the negative pole of the armature. Current from the positive pole of armature 61ª also flows from bar 65 through contacts 67 to magnet winding 70 and thence by wires 71 and 39 through field winding 61 to the negative pole of the armature. It will be observed that winding 70 and generator field winding 61 receive current through two circuits and that although in the first circuit the thermostat blades be broken by the separation of contacts 6 and 10, as will hereinafter appear, the windings 70 and 61 will still remain energized from current received from the armature 61ª so long as the dynamo-electric machine continues to operate as a generator.

As the voltage rises with continued charging of the battery, the blade 3 swings over toward the blade 2 and when it reaches a predetermined value contact is made at 5—9 to complete the circuit 41—68—65—67—72—40, thus diverting the current from the winding 70 and permitting the bar 65 to fall or be drawn away from the contacts 68—67—66 and interrupting an engine controlling circuit, say an ignition circuit, which is automatically made when the bar 65 is initially actuated, and which includes the conductor 41, the contact 68, the bar 65, the contact 73, the conductor 74 and suitable other apparatus, not shown.

Certain modified uses of the thermostatic apparatus will be apparent, for example, if it were desired to impress on the circuit 40—9—5—2—39 only voltages above a certain value, the adjustment of the blades 2—3 would be made such that contacts 5—9 would separate only when the voltage across the winding 44 fell below that amount; and, conversely, the blades 3—4 might be so adjusted that the contacts 6—10 would separate only when a voltage greater than a desired amount were impressed on the winding 44. In some cases, as in simple contact makers or breakers, one of the blades 2 or 4 may be omitted.

For the more accurate work wherein it is desirable to relieve the blades 2—4 from the influence of heat radiated from the coil 44, the latter may be enclosed in a suitable screen, such as the heat insulating tube 75 of asbestos, fibre, or the like, which may be mounted on the base through the medium of the screws 76 and the stamping 42 whose lower end 78 is in-turned beneath the flange on the post 13. This enclosure also gives rise to a somewhat quicker operation of the device, in that it intercepts the heat rays and reflects them back onto the coil and bar.

In Figs. 9 and 10 is illustrated one manner of utilizing the relative movement of the thermostat bars 3'—4' for operating a mechanical element, in this instance a pivoted latch 80, whereby a quick break switch 81 is normally held in position against the force of the spring 82 to complete electrical connection between the conductors 83 and 84. The latch is provided with a bearing surface 85, approximately perpendicular to the direction of movement of the outer ends of the thermostat bars, whereon the toggle formed by the links 86—87 pivotally connected to the bars at 88—89 and to each other at 90, bears. For changes of environment temperature, the joint 90 merely slides along the surface 85, as indicated in dashed lines, but in the event of the passage of current through the winding 44' of the blade 3' this blade is caused to approach the blade 4', and the toggle joint is thrust outwardly to release the latch from the switch bar as shown in Fig. 10.

Obviously, the thermostat elements may be inter-connected in widely different ways, and may serve to actuate mechanical elements whose ultimate function may be very different from that described. In accordance with the patent statutes, I have shown one such connection and use, but I do not wish to be limited thereby.

I claim:—

1. A thermostat device comprising a plurality of thermostatic elements whose movements due to environment temperature are compensatory, and which have relative movement on increase in temperature of one of the elements in respect to the other, means for utilizing said relative movement, and means for applying heat to one of said elements to raise its temperature above the environment temperature.

2. In a thermostatic device, a pair of thermostat elements having substantially a predetermined relation to each other when their temperatures are equal, regardless of the absolute value of said temperature, and having another relation to each other when their temperatures are unequal, a resistance coil associated with one of said elements to raise its temperature above that of the common environment of said elements, and means for utilizing the change in the relation of said elements due to a change in the relative temperatures of said elements.

3. An environment temperature compensated thermostatic device including a plurality of thermostat elements, means for applying heat to one of said elements to raise its temperature above that of the environment, and means for utilizing the relative movement of said elements due to said change in temperature.

4. In combination, a plurality of thermostatic elements each anchored at one end and having their free ends adapted to approach or recede from one another upon relative change in temperatures of said elements, means for heating one of said elements above the temperature of the environment, and means for utilizing said relative movement of said elements, the parts being so constructed and arranged that the movements of said elements tend to compensate for temperature changes to which they are equally subjected.

5. A pair of similarly arranged thermostat blades offset laterally from each other and anchored at corresponding ends, one of the blades being axially adjustable, one of the blades including a contact carrying element offset from its free end toward the other blade, and a second contact supported by the free end of the other blade and adapted to co-operate with the first named contact to complete an electric circuit.

6. Thermostat means carrying two angularly adjustable contacts movable together and in the same direction upon a change in environment temperature, said contacts being adapted to form part of an electric circuit, one of the contacts also being movable toward or from the other upon relative change in temperature in portions of the thermostat means to make or break said circuit.

7. A thermostatic device including a plurality of thermostat elements whose movements due to environment temperature are compensatory and which have relative movement on increase in temperature of one of the bars in respect to the other, an electric resistance coil associated with one of said elements to heat the same above the temperature of the other element and above the environment temperature, means operable by said relative movement, and a heat insulating screen interposed between said elements.

8. A thermostatic device comprising in combination, a thermostat blade wound with a heating coil, a contact carried by said thermostat blade, a second blade spaced from said thermostat blade and carrying a contact adapted to cooperate with the first-mentioned contact, and a heat insulating screen between said blades and spaced from said thermostat blade.

9. A thermostatic device comprising in combination, a thermostat blade wound with a heating coil, a contact carried by said thermostat blade, a tubular heat insulating screen surrounding said thermostat blade, and means outside said tubular heat insulating screen having a contact adapted to co-operate with said first-mentioned contact.

10. A thermostatic device comprising in combination, a thermostat blade wound with a heating coil, a tubular heat insulating screen surrounding said thermostat blade and spaced therefrom, co-operating contacts adapted to be actuated by said thermostat blade, and means outside said tubular heat insulating screen for supporting one of said contacts.

11. A thermostat blade, a post to which the blade is anchored, a base in which the post is angularly adjustable, whereby the blade may be made to function in one plane or another as desired.

12. A thermostat blade anchored at one end, an arm fastened to the other end of the blade and projecting laterally therefrom, said arm carrying a contact, a second contact adapted to co-operate with the first to complete an electric circuit, said blade being adjustable angularly to bring the first contact closer to or farther from the second as desired.

13. Three thermostat blades adapted to swing in parallel planes and carrying contacts adapted to complete either one of two electric circuits, one of the circuits being completed under normal conditions, and means for heating one of the blades above the temperature of the common environment by said blades to cause it to break the normal circuit and make the other circuit.

14. A thermostat blade, a post to which it is anchored, a base wherein the post is angularly adjustable, an adjusting arm fastened to the post to impart such angular adjustment, and means for securing the arm in any desired position of adjustment.

15. A thermostat blade, a post to which it is anchored, a base wherein the post is angularly adjustable, a toothed arm secured to the post, there being a tool socket adjacent said arm adapted to form a guide for an adjusting tool.

16. An electrically heated thermostat blade, a heat insulating screen for said blade, a metal support for the screen, said support forming a binding post for a conductor through which current for heating the blade passes.

17. Three thermostat blades adapted to swing by changes in environment temperature, and means for heating one of the blades to raise its temperature above the environment temperature and above that of the other two, the parts being so constructed and arranged that an increase in temperature of said blade causes it to contact with one of the other two blades and a decrease of said temperature causes it to contact with the other blade.

JAMES B. REPLOGLE.